May 11, 1926.

C. O. HARKER

ANIMAL TRAP STRUCTURE

Filed June 2, 1924

1,584,091

Witness
Lynn Latta

Inventor
Charles O. Harker
By
Baier Freeman
Atty

Patented May 11, 1926.

1,584,091

UNITED STATES PATENT OFFICE.

CHARLES O. HARKER, OF GRAND JUNCTION, IOWA.

ANIMAL-TRAP STRUCTURE.

Application filed June 2, 1924. Serial No. 717,279.

It is my purpose to provide an animal trap structure of very simple and efficient construction.

More particularly, it is my object to provide in a self-setting animal trap, a novel structure including a casing and a platform upon which the animal walks upon entering the trap, said device including means for locking the trap in its normal upright position until the animal reaches a certain point whereupon such means is released and the platform is then released, and the platform is then tilted laterally for discharging the animal from the platform.

A further object is to provide a form of my invention in which one platform has a tilting movement in two directions and is so constructed and mounted that the first slight tilting movement in one direction releases the whole device and permits the platform to tilt in another direction for discharging the animal therefrom.

Still a further object is to provide a novel form of animal trap structure having a tiltable platform with means serving both as a counter balance and as a closure member for closing the trap opening when the platform is tilted to discharging position.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

My improved trap may be made in a variety of forms and it is here shown in a form for the purpose of illustration and for showing a particular structure in which my invention may be embodied.

Figure 3:
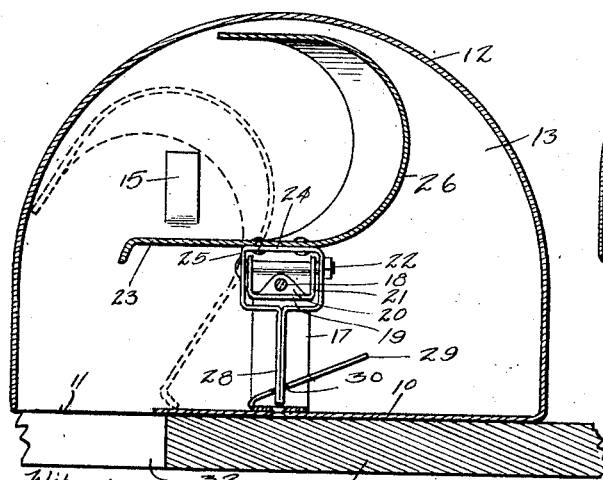
Figure 3 shows a transverse, vertical, sectional view taken on the line 3—3 of Figure 2.

My trap comprises a casing, comprising a bottom member indicated in the accompanying drawings by the reference numeral 10, which bottom is provided at one side of the trap with an opening 11, as shown in Figure 3.

The trap has a main body 12 in the form of a downwardly opening channel which is almost semi-cylindrical in shape. The ends of the body are the front and rear end members 13 and 14.

A tongue 15 is punched from the front end member 13 and left attached at one end and is forced inwardly slightly to form a bait holder.

In the other end 14 is formed an entrance opening 16 for mice, rats or other animals.

Mounted on the floor 10 above the middle of the floor from side to side and spaced nearer the rear than the front end of the trap is an upwardly extending bracket 17 having forwardly and rearwardly spaced members, which at their upper ends carry a longitudinally arranged horizontal pintle or shaft 18.

A bracket 19 has its main body portion arranged just below the pintle 18 between the members of the bracket 17 and is provided at its ends with upwardly projecting ears 20 mounted on the pintle 18 and at its sides with upwardly projecting ears 21 carrying the pintle 22.

I provide a platform 23, secured to the underside of the platform is a bracket 24 having downwardly extending ears 25 mounted on the pintle 22 for thus giving to the platform tilting movement in two directions.

The platform 23 has a free edge normally above the opening 11 and has at its other side a wall 26 curved upwardly and then over the main portion of the platform 23, having substantially the shape of a longitudinal half of a funnel with its larger end adjacent the opening 16.

Figure 1:
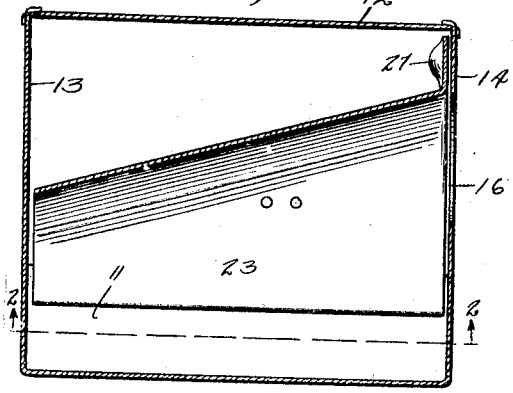
Figure 1 shows a horizontal, sectional view through the upper portion of a trap embodying my invention.
Figure 4:
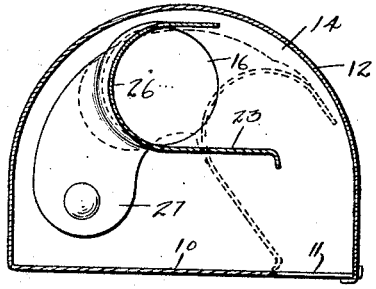
Figure 4 is a horizontal, sectional view taken on line 4—4 of Figure 2, looking in the opposite direction from the view shown in Figure 3.
Figure 5:
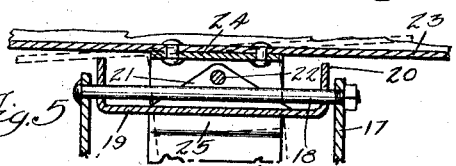
Figure 5 is an enlarged, vertical, longitudinal, sectional view of the tilting mounting structure of the platform.

Secured to the rear end of the wall 26 is a weighted plate 27, which extends downwardly as shown in Figure 4 when the platform 23 is in its normal, horizontal position and for serving to close the opening 16 when the platform 23 is tilted to discharging position.

Figure 2:
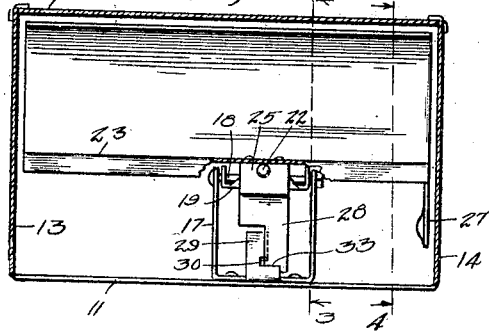
Figure 2 shows a longitudinal, sectional view taken on the line 2—2 of Figure 1.

Extending downwardly from the ears 25 is a locking arm 28 shown for instance in Figures 2 and 3.

Secured to the bottom 10 is a keeper and guide strip 29 inclined upwardly and laterally away from the opening 11, as shown in Figures 2 and 3 and having at its lower portion a notch 30 adapted to receive the locking arm 28, to prevent lateral tilting of the platform 23.

It will be noted that the weighted plate 27 extends downwardly from the wall 26 and also laterally toward that edge of the bottom 10 which is opposite the opening 11 so as to hold the platform 23 in position with the arm 28 in the notch 30 for thus preventing the platform from tilting endwise and upwardly.

When the platform is held in such position, the arm 28 received in the notch 30 prevents any lateral tilting of the platform 23 from its normal position, shown in Figure 3 in full lines, toward its discharging position, shown in dotted lines in the same figure.

I will now explain the process of operation of my improved trap structure whether it be embodied in the particular form shown herein or in any other equivalent form.

The trap structure herein shown is preferably placed over a container 31, only a portion of which is here shown, having a receiving opening 32 registering with the opening 11.

The platform 23 is normally held in its horizontal position, as shown in Figure 3 for instance. The animal enters the opening 16 and moves inwardly on the platform 23 until it has advanced far enough to overcome the effect of the weighted plate 27 and to cause the platform to tilt downwardly and forwardly slightly from its position shown in Figure 2. This tilting movement of the platform 13 causes the arm 28 to be swung out of the notch 30 therefrom the weight of the animal causes the platform to be swung laterally from its position shown in Figure 3 to its dumping or discharging position, illustrated in dotted lines in Figure 3, whereupon the animal will slide off the platform through the opening 11 and into the receptacle support 31.

It will be noted that the peculiar form of the wall 26 is such as to guide the animal inwardly and also to the left as it advances on the platform 23 for insuring that the animal will walk to that forward portion of the platform 23 where its weight will properly operate the dumping platform.

Should the animal try to climb up the rounded side 26, it will slide down upon the platform 23 and cause the platform to tilt, first downwardly and inwardly and then laterally as heretofore explained.

When the platform 23 is tilted to its discharging position, the weighted plaform 27 swinging upwardly closes the opening 16 for preventing the escape of any animal already within the trap and for preventing the entrance of any other animal which might possibly interfere with the operation of the trap.

After the animal has been discharged from the platform 23, causing the tilting thereof, the weighted plate 27 will cause the platform and its wall 26 to swing back to normal position.

The member 29 serves to guide the locking arm 28 until it reaches the notch 30, whereupon the weighted plate 27 will cause the arm 28 to enter the notch 30 and the trap is re-set and is ready for another operation.

The member 29 has a shoulder 33, shown in Figure 2, which prevents the trap platform 23 from swinging beyond its normal and proper position.

Figure 6:
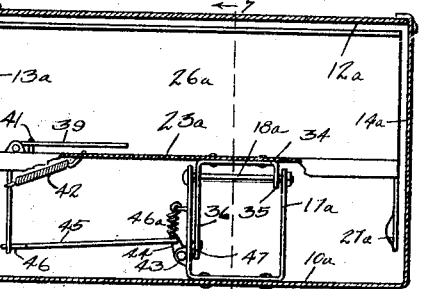
Figure 6 shows a longitudinal, sectional view through a trap embodying a modified form of my invention.
Figure 7:
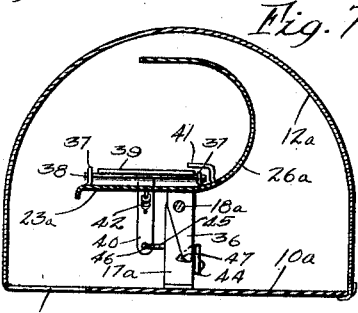
Figure 7 is a transverse, sectional view taken on the line 7—7 of Figure 6.

In Figures 6 and 7, I have shown a modified form of my invention in which the corresponding plates are indicated by the same reference numerals that have been used heretofore for such parts with the addition of the character "a", while other parts are indicated by the numerals hereafter set forth.

The modified form of my trap, which simply illustrates one of a variety of forms in which the trap may be embodied, has a bottom 10$^a$ provided with an opening 11$^a$ similar to the bottom 10 and the opening 11 heretofore described.

The top of the wall member 12$^a$ and end member is similar to the form already heretofore described. Extending upwardly from the bottom 10$^a$ is a bracket 17$^a$ having spaced arms supporting the pintle 18$^a$. A tilting platform 23$^a$ has the wall 26$^a$, said parts corresponding in shape and structure to the platform 23$^a$ and wall 26.

Under the platform 23$^a$, however, is a bracket 34 having a short ear 35 and a long ear 36 mounted on the pintle 18$^a$, as shown in Figure 6.

It will appear that the platform 23$^a$ is mounted in this particular form of my invention for lateral tilting movement only.

At the forward end of the platform 23$^a$ are spaced upwardly extending ears 37 in which I mount a transverse pintle 38 on which is fixed a trigger plate or platform 39, having an arm 40 extending downwardly through a suitable opening in the platform 23$^a$, as shown in Figures 6 and 7.

The downwardly swinging movement of the trigger shown on the platform 39 is limited by the platform 23ª and the upward swinging movement thereof is limited by a stop 41.

A coil spring 42 secured to the arm 40 and the underside of the platform 23ª normally holds the trigger plate 39 in its raised position slightly above the platform 23ª as shown in Figure 6.

Pivotally mounted at 43 on one arm of the bracket 17ª is a bell crank lever 44, one arm of which is pivoted to a link 45. The link 45 has a loose pivotal connection at 46 with the lower end of the arm 40.

The other arm of the lever 44 stands adjacent to and in the path of movement of the long arm 36 of the bracket 34, as shown in Figures 6 and 7 and prevents the tilting of the platform 23ª until the bell crank lever 44 is swung on its pivot to move the locking arm of the lever 44 out of the way of the arm 36.

The loose connection at 46 is such that when the parts are in their normal positions the locking arm of the lever 44 is in its locking position and the link 45 is in its forwardly moving position and any forward movement of the arm 40 will actuate the link 45 to swing the lever 44 to unlocking position. The lever 44 is held in locking position by a spring 46ª.

On the arm 36 is an inclined member 47 which is designed to engage the locking arm of the lever 44 for forcing the lever 44 out of the way of the arm 36 against the tension of the spring 46, when the platform 23 is moved by the weighted plate 27ª from discharged to normal or set position.

In the practical use of the trap of the form shown in Figures 6 and 7, the platform 23ª is held in its normal or set position by the locking arm of the lever 44 and the weight 27ª.

When an animal enters the trap and walks toward the forward end of the platform 23ª and steps on the trigger plate 39 thereby depressing it, the arm 40 is swung upwardly against the tension of the spring 42. This movement of the arm 40 imparts forward movement to the link 45 against the tension of the spring 46 for swinging the locking arm of the bell crank lever 44 out of the path of movement of the arm 36.

The weight of the animal thereupon causes the platform 23ª to tilt laterally for discharging the animal therefrom through the opening 11ª.

As soon as the animal has slid from the platform 23ª, the weighted plate 27ª swings the platform back upon the pintle 18ª to normal horizontal position.

The inclined element 47 engages the locking arm of the bell crank lever 44 pushing it out of the way until the arm 36 clears the lever 44. This movement swings the link 45 forwardly toward the front of the trap but on account of the loose connection 46, does not effect the position of the arm 40, which is retained in its proper position by the spring 42, the plate 39 and the stop 41.

As soon as the arm 36 clears the locking arm of the bell crank 44, said locking arm is snapped to locking position by the spring 46.

It will be seen from the foregoing somewhat detailed explanation of the structure of my trap as illustrated in the drawings, that the trap structure can be made in various forms and with a variety of modifications and it is my intention to cover by my claims any such modified forms of structure as may be reasonably included within their scope.

I claim as my invention:

1. A trap having a curved portion and a bottom portion, said bottom portion being provided near one side with a discharge opening, said trap having end members, one of said end members having an inlet opening, a platform mounted within said trap for receiving animals entering through said lateral opening and mounted to tilt in two directions, means for normally holding said platform in set position, said means including a locking device adapted to be released when the platform is tilted in one direction by the weight of an animal thereon, and a weighted plate adapted to serve as a counterbalance, and as a closure member for the inlet opening when the platform is tilted to discharging position.

2. In a trap structure of the kind described, a casing element having inlet and discharge openings, a platform mounted in said casing for tilting movement in two directions, means for holding said platform in set position, said means including a locking device adapted to be released when the platform tilts in one direction, and a weighted plate adapted to serve as a counter balance and as a closure member for the inlet opening when the platform is tilted to discharging position.

3. In a trap structure of the kind described, a casing element having inlet and discharge openings, a bracket in said casing having a pintle therethrough, a second bracket pivoted on said pintle having a second pintle therethrough substantially at right angles to said first pintle, a platform pivoted on said second pintle, an extending portion on said second bracket for engaging a notch in said first bracket, whereby said platform will be held in set position and tipping said platform on said second pintle will disengage said bracket, whereby said platform is free to pivot about said first pintle as and for the purposes stated.

CHARLES O. HARKER.